United States Patent [19]

Nishiguchi et al.

[11] Patent Number: 5,496,913

[45] Date of Patent: Mar. 5, 1996

[54] AROMATIC POLYCARBONATE, A METHOD FOR PRODUCING THE SAME, AND A PLASTIC OPTICAL WAVEGUIDE USING THE SAME

[75] Inventors: Masaki Nishiguchi, Chiba; Toshimasa Tokuda, Iyo, both of Japan

[73] Assignees: Furukawa Electric Co., Ltd; Teijin Chemicals Ltd., both of Tokyo, Japan

[21] Appl. No.: 140,414

[22] Filed: Oct. 25, 1993

[30] Foreign Application Priority Data

Nov. 2, 1992 [JP] Japan .................................. 4-294420
Nov. 2, 1992 [JP] Japan .................................. 4-315598
Nov. 2, 1992 [JP] Japan .................................. 4-315600

[51] Int. Cl.$^6$ .................................................. C08G 63/68
[52] U.S. Cl. .......................... 528/198; 524/445; 528/202; 528/482; 528/485; 528/490
[58] Field of Search ................................. 528/202, 167, 528/198, 482, 485, 490; 524/445

[56] References Cited

FOREIGN PATENT DOCUMENTS

| 0029111 | 5/1981 | European Pat. Off. . |
| 0152012 | 2/1984 | European Pat. Off. . |
| 0282062 | 9/1988 | European Pat. Off. . |
| 0316960 | 5/1989 | European Pat. Off. . |
| 12283 | 1/1987 | Japan . |
| 1019307 | 1/1989 | Japan . |
| 1031825 | 2/1989 | Japan . |
| 3045908 | 2/1991 | Japan . |
| 124603 | 4/1992 | Japan . |

OTHER PUBLICATIONS

Database WPI, Week 8909, Derwent Publications Ltd., London, GB; AN 89–066079 & JP–A–1 019–307, 23 Jan. 1989 (abstract).
Database WPI, Week 9115, Derwent Publications Ltd., London, GB; AN 91–105060 & JP–A–3 045 908, 27 Feb. 1991 (abstract).

*Primary Examiner*—James J. Seidleck
*Assistant Examiner*—John M. Cooney, Jr.
*Attorney, Agent, or Firm*—Birch, Stewart Kolasch & Birch

[57] ABSTRACT

There is provided an aromatic polycarbonate obtained by reacting a carbonate precursor substance with a dihydric phenol comprising mainly 2,2-bis(4-hydroxyphenol)-1,1,1,3,3,3-hexafluoropropane having specific characteristics. This aromatic polycarbonate has the following characteristics. That is, with respect to 5 wt % solution of the aromatic polycarbonate in methylene chloride, after being filtered through a filter having a pore diameter of 0.1 μm, the light transmittance at 400 nm measured by using a quartz cell having an optical path length of 250 mm, is 85% or more in terms of light transmittance per cm of the polymer; and when 0.7 g of the aromatic polycarbonate is dissolved in 100 ml of methylene chloride, the specific viscosity of the thus obtained solution measured at 20° C., is in the range of 0.160 to 0.418. The aromatic polycarbonate is excellent in heat resistance and transparency and good in moldability, and is suitable for a plastic optical waveguide that is small in transmission loss and excellent in heat resistance.

8 Claims, 1 Drawing Sheet

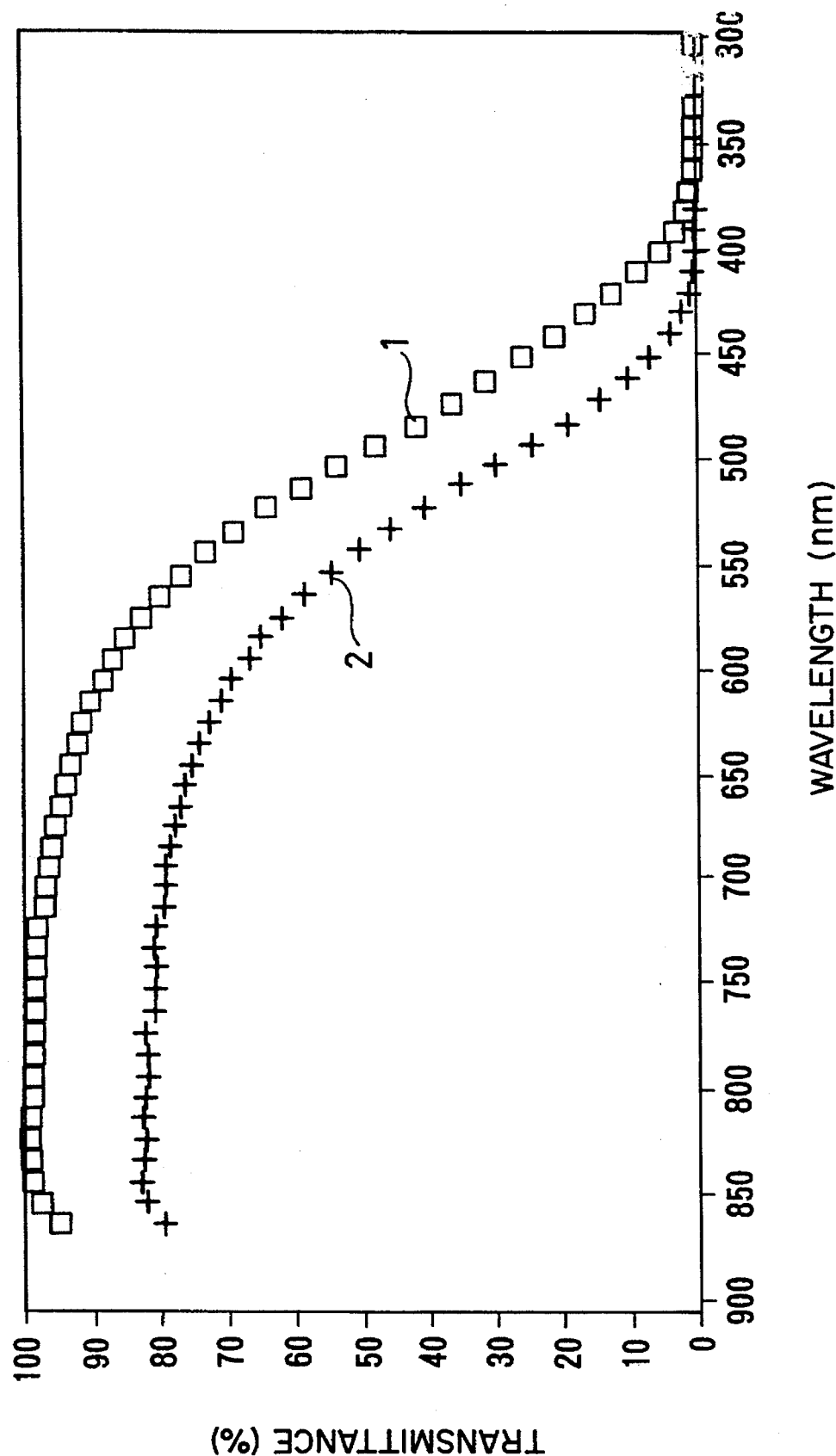

AROMATIC POLYCARBONATE, A METHOD FOR PRODUCING THE SAME, AND A PLASTIC OPTICAL WAVEGUIDE USING THE SAME

FIELD OF THE INVENTION

The present invention relates to an aromatic polycarbonate, a method for producing the same, and a plastic optical waveguide (e.g., plastic optical fiber) using the same. More particularly the present invention relates to an aromatic polycarbonate excellent in heat resistance and transparency and good in moldability, a method for producing the same, and a plastic optical waveguide that uses the same and is small in transmission loss and excellent in heat resistance.

BACKGROUND OF THE INVENTION

Aromatic polycarbonates obtained from 2,2-bis(4-hydroxyphenyl)propane (hereinafter abbreviated bisphenol A) and a carbonate precursor substance are conventionally known as typical aromatic polycarbonates. Since they have a variety of excellent properties; that is, they are transparent and they are excellent in heat resistance and mechanical properties, and good in dimensional accuracy, they are widely used as engineering plastics. However, in recent years, amid the trend that light weight, thinness, and compactness (downsizing) of machinery, tools, and the like are considered important, there are increased cases in which engineering plastics are used at locations closer to heat sources in optical usage. Consequently, it is demanded that engineering plastics be higher in heat resistance, in addition to improving of optical properties, such as light transmittance.

On the other hand, it is known that aromatic polycarbonates excellent in heat resistance can be obtained by reacting 2,2-bis(4-hydroxyphenyl)-1,1,1,3,3,3-hexafluoropropane (hereinafter abbreviated bisphenol AF) with phosgene or a carbonate precursor substance (Japanese Patent Publication No. 12283/1991). However, aromatic polycarbonates obtained from usual bisphenol AF are poor in heat stability, the molded product is colored yellow and is low in light transmittance, and it cannot be used in a field in which high transparency is required.

As one of usages wherein such a high transparency is required, there is a plastic optical fiber. Plastic optical fiber is high in light transmission loss and thus generally cannot be used for a long distance transmission, but since they are flexible and are easy in end workability, they should be useful for signal transmission lines of automobiles and electronic equipment.

Since the core layer of most conventional plastic optical fiber is made of a polymethyl methacrylate, it has a heat resistance no higher than 100° C., and therefore the conventional plastic optical fibers cannot be used in engine compartments of automobiles or in heat-resistant parts of electronic equipment.

To improve this, particularly when heat resistance is required, plastic optical fiber having a core layer that uses a polycarbonate (having structural formula (A) below) is used, but the heat resistance of optical plastic fiber using this polycarbonate is only 125° to 130° C.

Plastic optical fiber having a core layer that uses a polycarbonate AF (having structural formula (B) below) has also been studied. This polycarbonate has a glass transition temperature as high as 157° C. and is excellent in oxidation resistance. However, according to study made by the present inventors, although commercially available bisphenol AF is used to produce a polycarbonate AF, the resultant product is low in light transmittance and poor in heat stability. Therefore, if this polycarbonate AF is used as a core material to make a plastic optical fiber, the transmission loss becomes high and a plastic optical fiber low in transmission loss could not be obtained. Further, when such plastic optical fiber was kept at high temperatures, a large increase in transmission loss was observed.

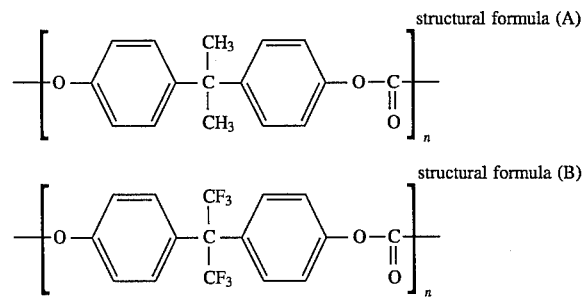

SUMMARY OF THE INVENTION

According to the present invention, there is provided an aromatic polycarbonate having a specific viscosity within a specified range and being excellent, for example, in optical properties, transparency, heat resistance, heat stability, and molding properties that can be obtained by reacting a dihydric phenol component that is mainly made up of bisphenol AF with a polycarbonate precursor substance.

An object of the present invention is to provide an aromatic polycarbonate excellent in heat resistance and transparency and good in moldability.

Another object of the present invention is to provide a method for producing an aromatic polycarbonate remarkably excellent in heat resistance and transparency and good in moldability.

Still another object of the present invention is to provide a plastic optical fiber that overcomes the defects of the above conventional polycarbonate AF and has high heat resistance and low transmission loss.

Other and further objects, features, and advantages of the invention will appear more evident from the following description taken in connection with the accompanying drawing.

BRIEF DESCRIPTION OF THE DRAWING

FIG. 1 is a chart of the spectral light transmittance of polymer solutions after the heat treatment, showing the oxidation resistance of polymers.

DETAILED DESCRIPTION OF THE INVENTION

The present inventors, having studied keenly to improve the heat stability of the aromatic polycarbonate obtained from bisphenol AF in order to attain the above objects, have found that, when a specific bisphenol AF is phosgenated at a certain temperature or below, with the phosgene controlled to a certain range of molar ratio, an aromatic polycarbonate excellent in heat resistance, remarkably improved in light transparency, and good in molding properties is obtained.

The present inventors have also found that plastic optical fiber employing a polycarbonate AF as core material that has been synthesized using a specific bisphenol AF as a major raw material, and has a molecular weight in a specific range, shows transmission characteristics; it is low in transmission loss; and its increase in transmission loss is small even when used at a high temperature. The present invention has been completed based on these findings.

That is, first, according to the present invention there is provided an aromatic polycarbonate that is obtained by reacting a carbonate precursor substance with a dihydric phenol that is mainly made up of 2,2-bis(4-hydroxyphenol)-1,1,1,3,3,3-hexafluoropropane having the following characteristics: with respect to a 20 wt % ethanol solution of the bisphenol AF dried for 10 hours at 70°±10° C. under a reduced pressure of 10 mmHg, the solution being filtered through a filter having a pore diameter of 0.1 µm, the transmittance of light of 400 nm of the filtrate, measured using a quartz cell having an optical path length of 250 mm, is 90% or more, and the content of impurities of the bisphenol AF, analyzed by liquid chromatography, is 0.02 wt % or less. The said aromatic polycarbonate has the following characteristics: when it is dissolved in methylene chloride, to form a 5 wt % solution of the aromatic polycarbonate in methylene chloride, and then the solution is filtered through a filter having a pore diameter of 0.1 µm, the transmittance of light of 400 nm of the filtrate, measured by using a quartz cell having an optical path length of 250 mm, is 85% or more in terms of light transmittance per cm of the polymer; and when 0.7 g of the aromatic polycarbonate is dissolved in 100 ml of methylene chloride, the specific viscosity of the thus obtained solution, measured at 20° C., is in the range of 0.160 to 0.418.

Further, according to the present invention there is provided a method for producing an aromatic polycarbonate by reacting an aqueous alkali solution of a dihydric phenol, which phenol is made up mainly of 2,2-bis(4-hydroxyphenyl)-1,1,1,3,3,3-hexafluoropropane, with phosgene in the presence of an organic solvent, in which a specific 2,2-bis(4-hydroxyphenyl)-1,1,1,3,3,3-hexafluoropropane having the following characteristics is used: with respect to a 20 wt % ethanol solution of the 2,2-bis(4-hydroxyphenyl)-1,1,1,3,3,3-hexafluoropropane dried for 10 hours at 70°±10° C. under a reduced pressure of 10 mmHg, the solution being filtered through a filter having a pore diameter of 0.1 µm, the transmittance of light of 400 nm of the filtrate, measured using a quartz cell having an optical path length of 250 mm, is 90% or more, and the content of impurities of the 2,2-bis(4-hydroxyphenyl)-1,1,1,3,3,3-hexafluoropropane, analyzed by liquid chromatography, is 0.02 wt % or less; the molar amount of the phosgene to be used is 1.15 to 1.20 times the mol of the dihydric phenol; and the reaction is carried out at a temperature of 20° C. or below.

Further the present invention provides:

A plastic optical waveguide which comprises a plastic optical waveguide whose core layer is made of an aromatic polycarbonate obtained by reacting a carbonate precursor substance with a dihydric phenol, which phenol is mainly made up of 2,2-bis(4-hydroxyphenyl)-1,1,1,3,3,3-hexafluoropropane, the relationship between the transmission loss at 660 nm and the transmission loss at 760 nm for the plastic optical waveguide being L660 nm<L760 nm+600<1,500 wherein L660 nm represents the transmission loss (dB/km) at 660 nm, and L760 nm represents the transmission loss (dB/km) at 760 nm; and a plastic optical waveguide as stated above, wherein the aromatic polycarbonate of the core layer has the following characteristics: with respect to a 5 wt % methylene chloride solution of the aromatic polycarbonate being filtered through a filter having a pore diameter of at least 0.1 µm, the transmittance of light of 400 nm of the filtrate, measured by using a liquid cell having an optical path length of 250 mm, is 85% or more in terms of light transmittance per cm of the resin; and when 0.7 g of the aromatic polycarbonate is dissolved in 100 ml of methylene chloride, the specific viscosity of the thus obtained solution, measured at 20° C., is in the range of 0.160 to 0.418.

The present invention is now described in detail.

As a preferable method for preparing bisphenol AF to be used for production of aromatic polycarbonate of the present invention, a method wherein hexafluoroacetone is reacted with phenol under conventional conditions can be mentioned. Then the resulting product is purified by using benzene derivatives and an activated clay. By this method a specific bisphenol AF having the specific characteristics above-mentioned can be obtained. That is, when the bisphenol AF is dried for 10 hours at 70°±10° C. under a reduced pressure of 10 mmHg, and then is dissolved in ethanol, to form a 20 wt % solution of the bisphenol AF in ethanol, and the solution is filtered through a filter having a pore diameter of 0.1 µm, the transmittance of light of 400 nm of the filtrate, measured using a quartz cell having an optical path length of 250 mm, is 90% or more, and the content of impurities of the bisphenol AF, analyzed by liquid chromatography, is 0.02 wt % or less.

The optical path length of a commercially available quartz cell for determining light-transmittance of liquid is generally 10 mm, or 100 mm at the longest. By using a quartz cell having such a short optical path length, the small difference in light-transmittance corresponding to a change of purity of bisphenol AF having 99% or higher purity, cannot been identified, because each obtained light-transmittance is nearly 100% and has a measurement error larger than the actual difference of light-transmittance. The difference of purity of bisphenol AF having 99% or higher purity can be accurately determined for the first time as a distinct difference in light-transmittance by using a quartz cell having an optical path length of 250 mm of this invention. Thus, the bisphenol AF used in the present invention is a specified bisphenol AF that can be selected by using, as a measure of purity, the light-transmittance measured by using a quartz cell having an optical path length of 250 mm. If instead of that special bisphenol AF, a commercially available bisphenol AF is used without purification, the desired aromatic polycarbonate excellent in light transmittance as well as in heat resistance cannot be obtained.

As the benzene derivative for the above purification, toluene, xylene, benzene, and a mixture thereof are preferably used; and the amount thereof to be used is such that the bisphenol AF can be dissolved, and it is generally about 2 to 10 times the amount of the bisphenol AF in terms of weight. As the activated clay, a commercially available activated clay, mainly made up of silica/alumina in the form of a powder or granules, can be used. The amount of activated clay to be used is not particularly restricted, and the amount is suitably increased or decreased according to the quality of bisphenol AF subjected to purification. Usually the amount of activated clay is in the range of from 0.1 to 50 wt %, preferably 0.5 to 30 wt %, based on bisphenol AF. Treatment temperature for purification is not particularly restricted, and is preferably in the range of from an ambient temperature to reflux temperature of solvent used. Treatment time is not also particularly restricted, and can be set suitably based on the temperature and/or the processing effect. Usually the treatment time is in the range of from 0.5 to 3 hours.

In the present invention, a part of the above bisphenol AF may be replaced with other dihydric phenol within the range not departing from the object of the present invention. Examples of other dihydric phenol are bisphenol A, bis(4-hydroxyphenyl)methane, 2,2-bis(4-hydroxy-3-methylphenyl)propane, 4,4-bis(4-hydroxyphenyl)-heptane, 2,2-bis(4-hydroxy-3,5-dichlorophenyl)propane, 2,2-bis(4-hydroxy-3,5-dibromophenyl)propane, bis(4-hydroxyphenyl)oxide, bis(3,5-dichloro-4-hydroxyphenyl)-oxide, 4,4'-dihydroxydiphenyl, 3,3'-dichloro-4,4'-dihydroxydiphenyl, bis(4-hydroxyphenyl)sulfone, bis(3,5-dimethyl-4-hydroxyphenyl)sulfone, resorcinol, hydroquinone, 1,4-dihydroxy-2,5-dichlorobenzene, 1,4-dihydroxy-3-methylbenzene, bis(4-hydroxyphenyl)sulfide, and bis(4-hydroxyphenyl)sulfoxide, with particular preference given to bisphenol A.

As the carbonate precursor substance that is reacted with the above bisphenol AF, for example, phosgene and diphenyl carbonate can be mentioned. To produce the aromatic polycarbonate of the present invention, a usual process of producing an aromatic polycarbonate from bisphenol A can be used; for example, the reaction between a dihydric phenol and phosgene, or the transesterification between a dihydric phenol and a bisaryl carbonate, may be used. The reaction between a dihydric phenol and phosgene is carried out usually in the presence of an acid-bonding agent and an organic solvent. As the acid-bonding agent, for example, a hydroxide of an alkali metal, such as sodium hydroxide and potassium hydroxide, and pyridine can be used. As the organic solvent, for example, a halogenated hydrocarbon, such as methylene chloride and chlorobenzene, can be used. Further, in order to promote the reaction, a catalyst, such as a tertiary amine and a quaternary ammonium salt, can be used; and as a molecular weight modifier, a terminating agent is desirably used, such as phenol and p-tert-butylphenol. The reaction temperature is usually 0° to 40° C.; the reaction time is from a few seconds to 5 hours; and the pH during the reaction is preferably kept at 10 or over.

In transesterification, a dihydric phenol and a bisaryl carbonate are mixed in the atmosphere of an inert gas and are reacted usually at 120° to 350° C. under reduced pressure. The reduced pressure is changed in two steps and is finally brought to 1 mmHg, to distill off formed phenols from the system. The reaction time is usually about 1 to 4 hours. Further, if necessary, a molecular-weight-controlling agent and an antioxidant may be added.

In the method of producing the polycarbonate of the present invention, preferably a reaction of dihydric phenol and phosgene, as described above, is used. That is, the phosgenation is carried out first. The phosgenation is carried out in such a way that a dihydric phenol is dissolved in an aqueous alkali solution, an organic solvent is added thereto, and, after phosgene is reacted with the temperature kept at 20° C. or below, preferably 10° to 15° C., a polycondensation reaction is effected. To cause phosgene to react with the dihydric phenol in the aqueous alkali solution, gaseous phosgene is blown into the aqueous alkali solution, or liquid phosgene is mixed with the aqueous alkali solution. If the reaction temperature exceeds 20° C., decomposition of the terminal chloroformate increases and the heat stability of the resulting aromatic polycarbonate is deteriolated. The molar ratio of phosgene to be used is preferably in the range of from 1.15 to 1.20 per mol of the total dihydric phenol in terms. If the molar ratio of the phosgene too small, the phosgene to be involved in the reaction becomes insufficient and an aromatic polycarbonate having a satisfactory degree of polymerization is hardly obtained; whereas if the molar ratio is too large, the terminal chloroformate remains in a large amount or the terminal chloroformate is hydrolyzed, to increase the amount of terminal OH groups, and therefore the heat stability of the resulting aromatic polycarbonate becomes poor. During the reaction the pH is preferably kept at 10 or over, and at the time of phosgenation a small amount of a reducing agent, such as hydrosulfite, may be added.

The alkali used herein is preferably a strongly basic compound, such as a hydroxide of an alkali metal or an alkali earth metal, with particular preference given to sodium hydroxide and potassium hydroxide or the like. The water used in the aqueous alkali solution is preferably one subjected to ion-exchange treatment, and preferably the aqueous alkali solution is used after being deoxidized by passage of nitrogen gas or the like. The concentration of the aqueous alkali solution is usually 3 to 10 wt %, preferably 5 to 7 wt %. The concentration of the dihydric phenol dissolved in the aqueous alkali solution is usually 10 to 30 wt %, preferably 15 to 20 wt %. As the organic solvent, an organic solvent inert to the reaction, for example a halogenated hydrocarbon, such as methylene chloride and chlorobenzene, is preferable, and the organic solvent is also used preferably after being deoxidized, like the aqueous alkali solution.

The polycondensation reaction is effected usually at a temperature of 25° to 35° C., preferably 28° to 30° C. The reaction time is generally 10 min to 5 hours, preferably 30 min to 2 hours. During the reaction, the pH is preferably kept at 12 or over. Further, in order to promote the reaction, a small amount of an amine catalyst can be used. As preferable catalysts, quaternary ammonium compounds and tertiary amines, such as triethylamine, trimethylamine, triethylammonium bromide, and triethylammonium hydroxide, can be mentioned, and the amount of the catalyst to be used is usually 0.0001 to 0.01, preferably 0.002 to 0.005, in terms of molar ratio to the dihydric phenol.

In the present invention, an end-terminating agent can be used. As the end-terminating agent, for example, a monohydric phenol, such as phenol and an alkylphenol, phenyl chlorocarbonate, or an acid halide, such as an aromatic or aliphatic carboxylic acid chloride, is used in a prescribed amount in a known manner.

If the molecular weight of the thus obtained aromatic polycarbonate is too small, molded articles become brittle, whereas if the molecular weight thereof is too large, the flowability of the melt becomes poor and good molded articles are hardly obtained; and therefore preferably the aromatic polycarbonate has the following characteristics: when 0.7 g of it is dissolved in 100 ml of methylene chloride, the specific viscosity, measured at 20° C., is 0.160 to 0.418, particularly preferably 0.165 to 0.345. The aromatic polycarbonate preferably has the following characteristics: when it is dissolved in methylene chloride, to form a 5 wt % solution of the polymer in methylene chloride, and then the solution is filtered through a filter having a pore diameter of 0.1 μm, the transmittance (X) of light of 400 nm of the filtrate, measured by using a quartz cell having an optical path length of 250 mm, is 85% or more in terms of light transmittance per cm of the polymer, in accordance with the following conversion formula:

$$X = 10^{-\epsilon} \times 100$$

$$\epsilon = -\frac{1}{25 \times (C/1.47)} \times \log_{10}\left(\frac{Y}{100}\right)$$

wherein Y represents the measured transmittance of light (%), and C represents the measured concentration (wt %).

The aromatic polycarbonate of the present invention will be molded into a film, a fiber, or other molded product. As the molding method, the methods used for molding usual aromatic polycarbonates can be used, and, for example, the injection molding method, the compression molding method, the extrusion molding method, or the solution casting method may be arbitrarily used. To the aromatic polycarbonate obtained in accordance with the present invention and to its molded article, if required, various additives may be added, such as an antioxidant, a heat stabilizer, a light stabilizer, a lubricant, a releaser, a flame retarder, a dye, a pigment, an antistatic agent, and a weathering agent. These additives are mixed, for example, in the form of solutions, or are mixed in a known method, for example, by using a tumbler, a supermixer, or a NAUTA-mixer, and the mixture can be extruded into pellets or can be formed into a fiber, film, and the like. The aromatic polycarbonate can also be mixed with an inorganic material, such as glass fiber, carbon fiber, metal fiber, and talc, or some other thermoplastic resin, according to the usage thereof.

In particular, it is preferable that the aromatic polycarbonate of the present invention is mixed with at least one antioxidant that is a phosphite type, a phenol type, or an organosulfur type.

The phosphite-type antioxidant used herein includes, triesters of phosphorous acid and diesters or monoesters of phosphorous acid which are formed by substituting the ester parts of esters of phosphorous acid, for example, by an alkyl group, a phenyl group, or an alkylaryl group, such as triphenyl phosphite, tris(nonylphenyl) phosphite, tris(2,4-di-tert-butylphenyl)phosphite, tridecyl phosphite, trioctyl phosphite, trioctadecyl phosphite, didecyl-monophenyl phosphite, dioctyl-monophenyl phosphite, diisopropyl-monophenyl phosphite, monobutyl-diphenyl phosphite, monodecyl-diphenyl phosphite, monooctyl-diphenyl phosphite, bis(2,6-di-tert-butyl-4-methylphenyl)pentaerythritol diphosphite, 2,2methylenebis(4,6-di-tert-butylphenyl)octyl phosphite, bis(nonylphenyl)pentaerythritol diphosphite, bis(2,4-di-tert-butylphenyl)pentaerythritol diphosphite, tetrakis(2,4-di-tert-butylphenyl)-4,4-diphenylene phosphonite, which may be used alone or as a mixture of two or more, with particular preference given to tris(nonylphenyl) phosphite, tris(2,4-di-tert-butylphenyl) phosphite, and tetrakis(2, 4-di-tert-butylphenyl)-4,4-diphenylene phosphonite.

The phenol type antioxidant is a hindered phenol compound that is a phenol compound having a bulky group(s) in the ortho position(s) relative to the hydroxyl group of the phenol compound, such as triethylene glycol bis[3-(3-tert-butyl-5-methyl-4-hydroxyphenyl) propionate], 1,6-hexanediol-bis[3-(3,5-di-tert-butyl-4-hydroxyphenyl) propionate], pentaerythritol-tetrakis[3-(3,5-di-tert-butyl-4-hydroxyphenyl) propionate], octadecyl-3-(3,5-di-tert-butyl-4-hydroxyphenyl) propionate, 1,3,5-trimethyl-2,4,6-tris(3,5-di-tert-butyl-4-hydroxybenzyl)benzene, N-N'-hexamethylenebis(3,5-di-tert-butyl-4-hydroxy-hydrocinnamide), 3,5-di-tert-butyl-4-hydroxy-benzyl phosphonate diethyl ester, tris(3,5-di-tert-butyl-4hydroxy-benzyl) isocyanurate, and 3,9-bis{1,1-dimethyl-2-[β-(3-tert-butyl-4-hydroxy-5-methylphenyl)propionyloxy]-ethyl}-2,4, 8,10-tetraoxaspiro(5,5)undecane, with particular preference given to pentaerythritol-tetrakis[3-(3,5-di-tert-butyl-4-hydroxyphenyl) propionate] and octadecyl-3-(3,5-di-tert-butyl-4-hydroxyphenyl) propionate.

As the organosulfur antioxidant, for example, tetrakis[methylene-3-(hexylthio) propionate]methane, tetrakis[methylene-3-(decylthio) propionate]methane, tetrakis[methylene-3-(laurylthio) propionate]methane, tetrakis[methylene-3-(octylthio) propionate]methane, dilauryl-3,3'-thiodipropionate, dimyristyl-3,3'-thiodipropionate, distearyl-3,3'-thiodipropionate, ditridecyl-3,3'-thiodipropionate, 2,2-thio-diethylene-bis[3-(3,5-di-tert-butyl-4-hydroxyphenyl) propionate], 2,2-thiobis(4-methyl-6-tert-butylphenol), and 2-mercaptobenzimidazole can be mentioned, with particular preference given to tetrakis[methylene-3-(laurylthio) propionate].

The amount of such an antioxidant to be used is 0.001 to 1.0 part by weight per 100 parts by weight of the aromatic polycarbonate.

Since the aromatic polycarbonate polymer of the present invention has a high glass transition temperature, an excellent light transmittance, an excellent oxidation resistance, and good molding properties, the aromatic polycarbonate copolymer of the present invention is quite useful in the field wherein both high heat resistance and optical characteristics are required, and, for example, it is quite useful to be used as a material for various optical devices, such as headlamp lenses, a variety of lenses, prisms, optical waveguides such as optical fibers, connectors, optical disks, and liquid crystal panels.

Preferably, the aromatic polycarbonate polymer of the present invention is molded to a fiber to form an optical waveguide.

In this specification and the claims, "optical waveguide" means a light transmission device including an optical fiber, a lightguide, a plane optical waveguide, connecting parts of optical waveguide, and a light coupler.

According to the embodiment of optical fiber, the present invention is described below. However these description can basically be applied to other embodiments of optical waveguides.

The plastic optical fiber whose core material is the polycarbonate AF of the present invention does not show absorption in the region of 760 nm, and it can transmit light by using a light emitting diode (LED) that has a wavelength in that region. The LED in the region of 760 nm is very high in intensity and can transmit light over a long distance.

In the optical fiber of the present invention, the transmission loss (dB/km) of the polycarbonate AF at 660 nm is smaller than the transmission loss (dB/km) of 760 nm+600 dB/km. If this relationship is not satisfied, not only the transmission loss of the fiber in every wavelength is lowered but also the transmission loss in the short wavelength region increased conspicuously, and when white light is introduced, the emitted light becomes reddish. Further, if the transmission loss in 660 nm is not smaller than 1,500 dB/km, the transmittance of light by the plastic optical fiber is hindered.

If such a relationship is satisfied, when the plastic optical fiber is treated at a high temperature of about 145° C., the transmission loss increases hardly. Outside this relationship, the increase of the transmission loss at a high temperature becomes very large.

To make such a plastic optical fiber the polycarbonate AF of the present invention as described above can be used as a core material. If the transmittance is smaller than 85%, the above relationship for the transmission loss cannot be satisfied and the above problems arise.

Such a polycarbonate AF can be obtained by using as the raw material a bisphenol AF as described above having the specific characteristics.

As a clad layer of the plastic optical fiber of the present invention, a fluororesin, a silicone resin, and an imidated acrylic resin can be used. Examples of such resin includes a tetrafluoroethylene/hexafluoropropylene copolymer, a tetrafluoroethylene/perfluoroalkyl vinyl ether copolymer, an ethylene/tetrafluoroethylene copolymer, a fluorinated polymethyl methacrylate, Teflon AF (trade name, manufactured by E.I. du Pont de Nemours & Co. Inc.), and Cytop (trade name, manufactured by Asahi Glass Co., Ltd.).

The plastic Optical fiber can be formed by the conventional double extrusion method or some other known method. When the plastic optical fiber is obtained by the double drawing method, the temperature of the head is 240° to 280° C.

To lower the transmission loss, a preform is formed by a heated and reduced pressure-applied method disclosed in Japanese Patent Application No. 245433/1990, and the preform may be made into a plastic optical fiber.

Since the plastic optical waveguide of the present invention has the above-described special transmission characteristics, the transmission loss is very small and the emitted light has little reddish tint. The heat resistance of the present plastic optical waveguide is better than that of a plastic optical waveguide having a core layer of the conventional polycarbonate AF, and the present plastic optical waveguide exhibits an excellent effect in that the increase in transmission loss at high temperatures is small.

Now the present invention will be described with reference to the following Examples, wherein all the parts and the percentages quoted for showing proportions represent parts by weight and percentages by weight, and the measurement was conducted as follows.

(a) The light transmittance of the bisphenol AF

After a sample was vacuum-dried for 10 hours at 70° C. under a reduced pressure of 10 mmHg, the sample was dissolved in 99.5% ethanol, to form a 20% solution of the sample in ethanol, the solution was filtered through a filter having a pore diameter of 0.1 μm, and the transmittance of light of 400 nm for the filtrate was measured using a quartz cell having a optical path length of 250 mm through a U-3410 spectrophotometer, manufactured by Hitachi, Ltd.

(b) The purity of the bisphenol AF

After a sample was vacuum-dried for 10 hours at 70° C. under a reduced pressure of 10 mmHg, the sample was dissolved in methanol, to form a solution containing 1 g of the sample in 50 ml methanol, and the purity was measured by liquid chromatography using, as a column, Shimpack CLC-ODS (6 mm×150 mm), and, as a mobile phase, methanol/0.2% acetic acid water (80/20 in v/v), with the injected amount of the sample being 20 μl the column oven temperature being 50° C., and UV being 254 nm.

(c) The light transmittance of the polymer

A 5% solution of the polymer in methylene was filtered through a filter having a pore diameter of 0.1 μm; the transmittance of light of 400 nm for the filtrate was measured using a quartz cell having an optical path length of 250 mm through a U-3410 spectrophotometer, and the light transmission was expressed in terms of the light transmission per cm of the polymer.

(d) The specific viscosity 0.7 Grams of the polymer was dissolved in 100 ml of methylene chloride, and the viscosity of the solution was measured at 20° C.

(e) The hue b value

The measurement was carried out using a color difference meter, manufactured by Suga Tester KK., in accordance with JIS K-7105 and Z-8722.

(f) The heat stability

3 Grams of the polymer was sealed in a test tube, the air was removed from the test tube under a vacuum, and, after the polymer was heat-treated at 330° C. for 4 hours, the sample was dissolved in 200 ml of methylene chloride, and the transmittance of light of 600 nm for the solution was measured using a quartz cell having an optical path length of 100 mm through a U-3400 spectrophotometer.

(g) The oxidation resistance

After 40 g of the polymer was heated for 4 hours at 280° C. in an air atmosphere in a thermostatic chamber, the sample was dissolved in 400 g of methylene chloride; the transmittance of light of 860 nm to 280 nm for the solution was measured using a quartz cell having an optical path length of 250 mm through a U-3400 spectrophotometer, and the light transmittance was expressed in terms of the light transmittance per cm of the polymer. Examples of chart of spectral light-transmittance are shown in FIG. 1.

(h) The transmission loss

The transmission loss was measured by the 10 m/1 m cut-back method using, as light sources, an LED of 660 nm and an LED of 760 nm.

EXAMPLE 1

(A) 200 Parts of a commercially available bisphenol AF and 1,200 parts of toluene were charged into a reactor (four-necked flask) equipped with a stirrer, a thermometer, and a reflux condenser; the temperature was elevated, with stirring, until the bisphenol AF was dissolved; then 10 parts of activated clay was added, followed by stirring for 1.5 hours; then the activated clay was removed by filtering. Water was added to the colorless transparent filtrate; about 900 parts of the toluene was removed; the solution was cooled to room temperature, to deposit crystals, followed by filtration; then 300 parts of toluene and water were added to the obtained cake, and recrystallization was carried out. The transmittance of light of 400 nm for the obtained bisphenol AF was 91.2%, and the purity thereof was found to be 99.99% by liquid chromatography.

(B) 948.4 Parts of a 48.5% aqueous sodium hydroxide solution and 8251 parts of deionized water were charged into a reactor equipped with a stirrer, a thermometer, and a reflux condenser, and nitrogen gas was bubbled into the solution for about 3 min, to remove the oxygen. 2.4 Parts of hydrosulfide was added thereto, and, after 1740.5 parts of the bisphenol AF, having a purity of 99.99%, obtained in above (A), was dissolved therein, 6170 parts of methylene chloride was added, and 600 parts of phosgene was blown thereinto at 14° to 16° C. over about 60 min with stirring. Then, after 42.7 parts of p-tert-butylphenol and 322.6 parts of a 48.5% aqueous sodium hydroxide solution were added and they were stirred to be emulsified, 1.0 part of triethylamine was added and the mixture was stirred at 30° C. for about 2 hours, to complete the reaction. After the completion of the reaction, the product was sequentially diluted with methylene chloride, washed with water, and acidified with hydrochloric acid; then it was washed with water again until the electrical conductivity of the aqueous phase became the same as that of deionized water; then the methylene chloride was evaporated, to obtain an aromatic polycarbonate. The specific viscosity of this polymer was 0.175, the glass transition temperature thereof was 159° C., showing high heat resistance of the polymer; the color shade b value was 2.0, which is good; the light transmittance was as high as 90%, and the light transmittance after the heat treatment test was 85%, indicating excellent heat stability; and the oxidation resistance was as shown by 1 in FIG. 1, which indicates that quite good light transmittance was kept.

EXAMPLE 2

A commercially available bisphenol AF was purified in the same way as in Example 1(A), except that the amount of the activated clay was changed to 20 parts. The obtained purified bisphenol AF had a transmittance of light of 400 nm of 92.9%, and the purity measured by liquid chromatography was 99.99%. An aromatic polycarbonate was obtained in the same way as in Example 1(B), except that this purified bisphenol AF was used. The specific viscosity of this polymer was 0.182; the glass transition temperature was as high as 157° C.; the light transmittance was as high as 92%; the hue b value was as good as 1.8; and the light transmittance after the heat treatment test was 87%, which these results indicate quite excellent heat stability.

Comparative Example 1

A commercially available bisphenol AF was purified in the same way as in Example 1(A), except that the activated clay was not used. The obtained purified bisphenol AF had a transmittance of light of 400 nm of 43.2%, and the purity measured by liquid chromatography was 99.95%. An aromatic polycarbonate was obtained in the same way as in Example 1(B), except that this purified bisphenol AF was used. Although the specific viscosity of this polymer was 0.180 and the glass transition temperature was as high as 157° C., the hue b value was as poor as 4.3, the light transmittance was as low as 78%, the light transmittance after the heat treatment test was as low as 72%, and the oxidation resistance was poor as is shown by 2 in FIG. 1.

Comparative Example 2

An aromatic polycarbonate was obtained in the same way as in Example 1, except that the amount of the phosgene used was 584.6 parts (molar ratio: 1.14). Although the specific viscosity of this polymer was 0.159 and the glass transition temperature was 157° C., indicating high heat resistance, the hue b value was as poor as 4.5, and the light transmittance after the heat treatment test using a test tube was as low as 75%, showing poor heat stability.

Comparative Example 3

An aromatic polycarbonate was obtained in the same way as in Example 1, except that the temperature at which phosgene reacted was carried out was 25° C. The specific viscosity of the polymer obtained in this way varied between 0.154 and 0.193, and a polycarbonate stable in quality could not be obtained.

EXAMPLE 3

(Preparation of a Plastic Optical Fiber)

To form a core layer, the above polycarbonate prepared in Example 1, which had been passed through a 0.1-μm filter to eliminate foreign matter, was introduced into the resin introduction path of a spinning machine, and was made into a fiber with the head temperature being 235° C. A die was placed in the course of the draw-out and a thermosetting silicone resin (X-38-091HAB, manufactured by Shin-Etsu Chemical Co., Ltd.) was added thereinto. Silicone resin was thermoset by an oven positioned below the die, thereby a plastic optical fiber cladded a silicon resin layer on a polycarbonate core was obtained. The obtained plastic optical fiber had a core diameter of 0.96 mm and an outer diameter of 1.02 mm.

The transmission losses of the obtained plastic optical fiber were 1,1000 dB/km (660 nm: LED) and 780 dB/km (760 nm: LED). After this plastic optical fiber was heat-treated at 145° C. for one month, the transmission loss was 1240 dB/km (660 nm: LED). Further, when a white light source was incidented into this plastic optical fiber, the emitted light therefrom scarcely became reddish, showing relatively good reproduction of the white light.

EXAMPLE 4

To form a core layer, the above polycarbonate prepared in Example 2, which had been passed through a 0.1-μm filter to eliminate foreign matter, was introduced into a resin introduction path of a spinning machine, and was made into a fiber with the head temperature being 235° C. A die was placed in the course of the draw-out and a thermosetting silicone resin (X-38-091HAB, manufactured by Shin-Etsu Chemical Co., Ltd.) was added thereinto. Silicone resin was thermoset by an oven positioned below the die, thereby a plastic optical fiber cladded a silicon resin layer on a polycarbonate core was obtained. The obtained plastic optical fiber had a core diameter of 0.96 mm and an outer diameter of 1.02 mm.

The transmission losses of the obtained plastic optical fiber were 990 dB/km (660 nm: LED) and 700 dB/km (760 nm: LED). After this plastic optical fiber was heat-treated at 145° C. for one month, the transmission loss was 1070 dB/km (660 nm: LED).

EXAMPLE 5

150 Parts of a commercially available bisphenol AF, 600 parts of toluene, and 15 parts of activated clay were charged into an apparatus like one used in Example 1, followed by processing in accordance with the procedure taken in Example 1.

After two recrystallizations, filtration and drying were carried out, to yield a white needle-shaped crystal product.

The purity of the thus obtained bisphenol AF was measured by high-speed liquid chromatography and was found to be 99.99%, and the light transmittance was 97.2%.

This bisphenol AF was used as a raw material to obtain a polycarbonate AF in the same way as in Example 1.

The glass transition temperature of the thus obtained polycarbonate AF was 157° C., and the specific viscosity of 0.7 g/100 ml at 20° C. was 0.178. The light transmittance was 92%.

To form a core layer, the polycarbonate prepared above, which had been passed through a 0.1 μm filter to eliminate foreign matter, was introduced into the resin introduction path of a spinning machine, and was made into a fiber with the head temperature being 235° C. A die was placed in the course of the draw-out and a thermosetting silicone resin (X-38-091HAB, manufactured by Shin-Etsu Chemical Co., Ltd.) was added thereinto. Silicone resin was thermoset by an oven positioned below the die, thereby a plastic optical fiber cladded a silicon resin layer on a polycarbonate core was obtained. The obtained plastic optical fiber had a core diameter of 0.96 mm and an outer diameter of 1.02 mm.

The transmission losses of the obtained plastic optical fiber were 760 dB/km (660 nm: LED) and 570 dB/km (760 nm: LED). After this plastic optical fiber was heat-treated at 145° C. for one month, the transmission loss was 840 dB/km (660 nm: LED).

Comparative Example 4

To form a core layer, the polycarbonate prepared in Comparative Example 1, which had been passed through a 0.1 μm filter to eliminate foreign matter, was introduced into the resin introduction path of a spinning machine, and was made into a fiber with the head temperature being 235° C. A die was placed in the course of the draw-out and a thermosetting silicone resin (X-38-091HAB, manufactured by Shin-Etsu Chemical Co., Ltd.) was added thereinto. Silicone resin was thermoset by an oven positioned below the die, thereby a plastic optical fiber cladded a silicon resin layer on a polycarbonate core was obtained. The obtained plastic optical fiber had a core diameter of 0.96 mm and an outer diameter of 1.02 mm.

The transmission losses of the obtained plastic optical fiber were 3,000 dB/km (660 nm: LED) and 1,800 dB/km (760 nm: LED). After this plastic optical fiber was heat-treated at 145° C. for one month, the transmission loss was too great to be measured (more than 3,000 dB/km) (660 nm: LED). When white light was allowed to enter this optical fiber, the emitted light was tinted quite reddish.

Comparative Example 5

The bisphenol AF prepared in Comparative Example 1 that was purified without using the activated clay, and the bisphenol AF prepared in Example 1, were mixed to prepare a bisphenol AF having a light transmittance of 61%.

The thus obtained bisphenol AF was used as a raw material to obtain a polycarbonate AF in the same way as in Example 1. The light transmittance was 82%.

The glass transition temperature of the thus obtained polycarbonate AF was 157° C., and the specific viscosity of 0.7 g/100 ml at 20° C. was 0.184.

To form a core layer, the polycarbonate prepared above, which had been passed through a 0.1-μm filter to eliminate foreign matter, was introduced into the resin introduction path of a spinning machine, and was made into a thread with the head temperature being 235° C. A die was placed in the course of the draw-out and a thermosetting silicone resin (X-38-091HAB, manufactured by Shin-Etsu Chemical Co., Ltd.) was added thereinto. Silicone resin was thermoset by an oven positioned below the die, thereby a plastic optical fiber cladded a silicon resin layer on a polycarbonate core was obtained. The obtained plastic optical fiber had a core diameter of 0.96 mm and an outer diameter of 1.02 mm.

The transmission losses of the obtained plastic optical fiber were 1,800 dB/km (660 nm: LED) and 1,100 dB/km (760 nm: LED). After this plastic optical fiber was heat-treated at 145° C. for one month, the transmission loss was 2,300 dB/km (660 nm: LED). When white light was allowed to enter this optical fiber, the emitted light was tinted quite reddish.

Having described our invention as related to the present embodiments, it is our intention that the invention not be limited by any of the details of the description, unless otherwise specified, but rather be construed broadly within its spirit and scope as set out in the accompanying claims.

What we claim is:

1. An aromatic polycarbonate obtained by reacting a carbonate precursor substance with a dihydric phenol comprising mainly 2,2-bis(4-hydroxyphenol)-1,1,1,3,3,3-hexafluoropropane (hereinafter referred to as bisphenol AF) purified by using an activated clay, the amount of activated clay being from 0.1 to 50% by weight based on bisphenol AF, wherein
   (i) the bisphenol AF has the following characteristics:
      with respect to a 20 wt % ethanol solution of the bisphenol AF that is dried for 10 hours at 70±10° C. under a reduced pressure of 10 mmHg, after being filtered through a filter having a pore diameter of 0.1 μm, the light transmittance at 400 nm measured using a quartz cell having an optical path length of 250 mm, is 90% or more, and the content of impurities of the bisphenol AF, analyzed by liquid chromatography, is 0.02 wt % or less, and
   (ii) the said aromatic polycarbonate has the following characteristics:
      with respect to 5 wt % solution of the aromatic polycarbonate in methylene chloride, after being filtered through a filter having a pore diameter of 0.1 μm, the light transmittance at 400 nm measured by using a quartz cell having an optical path length of 250 mm, is 85% or more in terms of light transmittance per cm of the polymer; and when 0.7 g of the aromatic polycarbonate is dissolved in 100 ml of methylene chloride, the specific viscosity of the thus obtained solution measured at 20° C., is in the range of 0.160 to 0.418.

2. The aromatic polycarbonate as claimed in claim 1, wherein the specific viscosity of the aromatic polycarbonate solution is in the range of 0.165 to 0.345.

3. The aromatic polycarbonate as claimed in claim 1, wherein the aromatic polycarbonate comprises at least one antioxidant selected from the group consisting of phosphites and phenols or organosulfurs.

4. A method for producing an aromatic polycarbonate by reacting an aqueous alkali solution of a dihydric phenol, which phenol comprising mainly of bisphenol AF purified by using an activated clay, the amount of activated clay being from 0.1 to 50% by weight based on bisphenol AF, with phosgene in the presence of an organic solvent, in which
   with respect to a 20 wt % ethanol solution of the bisphenol AF dried for 10 hours at 70°±10° D. under a reduced pressure of 10 mmHg, the solution being filtered through a filter having a pore diameter of 0.1 μm, the transmittance of light of 400 nm of the filtrate, measured using a quartz cell having an optical path length of 250 mm, is 90% or more, and the content of impurities of the bisphenol AF, analyzed by liquid chromatography, is 0.02 wt % or less;
   the molar amount of the phosgene to be used is 1.15 to 1.20 times the mol of the dihydric phenol; and
   the reaction is carried out at a temperature of 20° C. or below.

5. The method for preparing an aromatic polycarbonate as claimed in claim 4, wherein the reaction with phosgene is carried out at a temperature in the range of 10 to 15° C.

6. The aromatic polycarbonate according to claim 1 wherein bisphenol AF is purified along with a benzene derivative.

7. The method according to claim 4 wherein bisphenol AF is purified along with a benzene derivative.

8. The aromatic polycarbonate according to claim 1, wherein said dihydric phenol consists essentially of bisphenol AF.

* * * * *